United States Patent
Anto et al.

(10) Patent No.: US 9,191,954 B2
(45) Date of Patent: Nov. 17, 2015

(54) DATA RESOURCE MAPPING FOR FREQUENCY-CODED SYMBOLS

(71) Applicant: TELEFONAKTIEBOLAGET L M ERICSSON (PUBL), Stockholm (SE)

(72) Inventors: Aram Anto, Stockholm (SE); George Jongren, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/103,466

(22) Filed: Dec. 11, 2013

(65) Prior Publication Data

US 2014/0177552 A1    Jun. 26, 2014

Related U.S. Application Data

(63) Continuation of application No. 13/299,623, filed on Nov. 18, 2011, now Pat. No. 8,638,742.

(60) Provisional application No. 61/431,982, filed on Jan. 12, 2011.

(51) Int. Cl.
*H04W 4/00* (2009.01)
*H04W 72/04* (2009.01)
*H04L 1/06* (2006.01)
*H04L 5/00* (2006.01)

(52) U.S. Cl.
CPC ......... *H04W 72/0453* (2013.01); *H04L 1/0606* (2013.01); *H04L 5/0023* (2013.01); *H04L 5/0044* (2013.01); *H04L 5/0058* (2013.01)

(58) Field of Classification Search
None
See application file for complete search history.

(56) References Cited

U.S. PATENT DOCUMENTS

| | | | |
|---|---|---|---|
| 2008/0130615 A1* | 6/2008 | Kashiwagi et al. | 370/343 |
| 2008/0253279 A1* | 10/2008 | Ma et al. | 370/206 |
| 2009/0022235 A1* | 1/2009 | Zhang et al. | 375/260 |
| 2009/0052561 A1* | 2/2009 | Baxley et al. | 375/260 |
| 2009/0161607 A1* | 6/2009 | Petersen | 370/329 |
| 2010/0002787 A1* | 1/2010 | Choi et al. | 375/260 |
| 2010/0172310 A1 | 7/2010 | Cheng et al. | |

(Continued)

FOREIGN PATENT DOCUMENTS

| WO | 2004/057894 A1 | 7/2004 |
|---|---|---|
| WO | 2008/088243 A1 | 7/2008 |
| WO | 2011/106457 A2 | 9/2011 |

OTHER PUBLICATIONS

3GPP TS 36.211 V10.0.0, Dec. 2010, "3rd Generation Partnership Project; Technical Specification Group Radio Access network; Evolved Universal Terrestrial Radio Access (E-UTRA); Physical channels and modulation (release 10)", 103 pages.

(Continued)

*Primary Examiner* — Otis L Thompson, Jr.
(74) *Attorney, Agent, or Firm* — Rothwell, Figg, Ernst & Manbeck, P.C.

(57) ABSTRACT

A device and method for communicating frequency-coded symbols that include data elements and reference symbols are disclosed. In one aspect, a carrier frequency band includes a plurality of subcarrier frequency bands. Data elements are transmitted and received on respective pairs of adjacent subcarrier frequency bands to provide diversity. Reference symbols are transmitted and received on predetermined subcarrier frequency bands. Muting is applied to selected subcarrier frequency bands based on the number and frequency configuration of the reference symbols.

19 Claims, 10 Drawing Sheets

(56) References Cited

U.S. PATENT DOCUMENTS

| | | | |
|---|---|---|---|
| 2011/0117926 A1 | 5/2011 | Hwang et al. | |
| 2011/0170496 A1 | 7/2011 | Fong et al. | |
| 2011/0170631 A1 | 7/2011 | Kim et al. | |
| 2011/0228735 A1 | 9/2011 | Lee et al. | |
| 2011/0230144 A1 | 9/2011 | Siomina et al. | |
| 2011/0235743 A1 | 9/2011 | Lee et al. | |
| 2011/0261673 A1 | 10/2011 | Luo et al. | |
| 2012/0046030 A1 | 2/2012 | Siomina et al. | |
| 2012/0057449 A1* | 3/2012 | Takaoka et al. | 370/210 |
| 2012/0058791 A1 | 3/2012 | Bhattad et al. | |
| 2012/0076106 A1 | 3/2012 | Bhattad et al. | |
| 2012/0120891 A1 | 5/2012 | Mazzarese et al. | |
| 2012/0195286 A1* | 8/2012 | Kim et al. | 370/330 |
| 2012/0220327 A1 | 8/2012 | Lee et al. | |

OTHER PUBLICATIONS

3GPP TSG-RAN WG1 #62bis; Oct. 11-15, 2010, Xi'an, China, "SFBC PDSCH transmission in CSI-RS subframes", 3 pages.

3GPP TSG-RAN WG1 Meeting #62bis, Xi'an, China, "Transmit Diversity in CSI-RS Subframes", Oct. 11-15, 2010, 2 pages.

Qualcomm Inc., "SFBC PDSCH transmission for LTE-A UEs", 3GPP Draft: R1-106352 SFBC Mapping, 3rd Generation Partnership Project (3GPP), Mobile Competence Centre; 650, Route Des Lucioles; F-06921 Sophia-Antipolis Cedex, France, vol. RAN WG1, Jacksonville, USA, Nov. 15-19, 2010, 4 pgs.

Qualcomm Inc., "SFBC PDSCH transmission in CSI-RS subframes", 3GPP Draft; R1-110333 SFBC PDSCH Transmission. 3rd Generation Partnership Project (3GPP), Mobile Competence Centre; 650, Route Des Lucioles, F-06921, Sophia-Antipolis Cedex, France, vol. RAN WG1, Dublin, Ireland, Jan. 17-21, 2011, 4 pgs.

Intel Corporation (UK): "Remaining details of CSI-RS structure", 3GPP Draft: R1-110249, 3rd Generation Partnership Project (3GPP), Mobile Competence Centre, 650, Route Des Lucioles; F-06921 Sophia-Antipolis Cedex, France, vol. RAN WG1, Dublin, Ireland, Jan. 16-22, 2011, 5 pgs.

Renesas Electronics Europe: "On the orphan RE issue in CSI-RS subframes", 3GPP Draft; R1-110186, 3rd Generation Partnership Project (3GPP), Mobile Competence Centre; 650, Route Des Lucioles, F-06921 Sophia-Antipolis Cedex, France, vol. Ran WG1, Dublin, Ireland, Jan. 17-21, 2011, 5 pgs.

International Search Report dated Jun. 6, 2012, corresponding to PCT/IB/2012/050065, 13 pgs.

"Digital cellular telecommunications system (Phase 2+); Universal Mobile Telecommunications System (UMTS); LTE; Circuit Switched (CS) fallback in Evolved Packet System (EPS);Stage 2 (3GPP TS 23.272 version 8.4.0 Release 8)", 50 pages, Jun. 1, 2009, XP014044533.

International Preliminary Report on Patentability dated Jun. 19, 2012, corresponding to PCT/IB2010/055888, 8 pages.

* cited by examiner

DATA RESOURCE MAPPING FOR FREQUENCY-CODED SYMBOLS

CROSS-REFERENCE TO RELATED APPLICATIONS

This application is a continuation of U.S. application Ser. No. 13/299,623, filed Nov. 18, 2011, which claims priority benefit under 35 U.S.C. §119(e) of U.S. Provisional Patent Application No. 61/431,982, entitled "Data Resource Mapping for SFBC Based Schemes in CSI-RS Subframes," filed Jan. 12, 2011. The contents of each of the referenced applications are incorporated herein by reference in their entirety.

TECHNICAL FIELD

The present invention relates to a device and method for communicating frequency-coded data elements and reference symbols, and more particularly, for communicating the data elements and reference symbols while muting all or selected subcarrier frequency bands based on the number and frequency configuration of the reference symbols.

BACKGROUND

Transmit diversity schemes enable increased reliability in the transmission of data through the use of multiple antennas at the transmitter. In a conventional transmit diversity scheme, space time block coding (STBC) and/or space frequency block coding (SFBC) are often used. One of the simplest and most commonly used STBC codes is known as the Alamouti transmission scheme. In the Alamouti scheme, data is sent in groups of two time slots, where the symbols [s0, −s1*] are sent in the first time slot from a two antenna transmitter (i.e., the first symbol s0 is sent through the first antenna, and the second symbol −s1* is sent through second antenna), and the same symbols with a certain phase shift and scaling [s1, s0*] are sent through the respective antennas in the second time slot. At the end of each second slot, the receiver can use a linear combination of the signals received during first and second time slots to decode s0 and s1 with a lower error probability as compared with the single-input-single-output (SISO) case.

One of the requirements of the Alamouti transmission scheme is that the channel conditions must be constant, or as close to constant as possible, during first and second time slots. In systems such as, for example, the Third Generation Partnership Project (3GPP) Long Term Evolution (LTE), in which several modulation symbols may be multiplexed in frequency for transmission, the Alamouti scheme can be used by exploiting the frequency domain instead of the time domain (i.e., the scheme becomes an Alamouti SFBC scheme). In the Alamouti SFBC scheme, the pairs of data symbols [s0, s1] and [−s1*, s0*] are transmitted in two frequency subcarriers instead of in two time slots. In order to comply with the requirement that the channel conditions be as close to constant as possible, the frequency subcarriers are typically selected to be adjacent to one another in frequency.

In one exemplary SFBC transmission scheme, a 10-ms frame consists of 10 subframes, each having a length of 1 ms. Each subframe consists of two slots, each having a length of 0.5 ms. Each slot is configured for communication of seven orthogonal frequency division multiplexed (OFDM) symbols. Each OFDM symbol is communicated on 12 consecutive subcarrier frequencies. The 12 consecutive subcarrier frequencies are referred to as a resource block (RB). Each individual subcarrier within a single OFDM symbol is referred to as a resource element (RE).

When using a SFBC transmission scheme in a system such as 3GPP LTE, an inability to identify two consecutive subcarrier frequencies for the transmission of the pair of data symbols may occur. For example, in some instances, a reference symbol or a muted reference symbol may be designated to be transmitted in a specific subcarrier frequency band.

A new type of reference symbol, known as channel state information reference symbol (CSI-RS) has been introduced in 3GPP LTE Release 10. In some cases, the presence of CSI-RS can lead to SFBC blocks being allocated to non-contiguous subcarriers if the current specifications are followed. Moreover, muting of CSI-RS patterns is also introduced in 3GPP LTE Release 10, which also leads to situations where frequency gaps inside SFBC codes appear when following current specifications. Accordingly, there is a need to address the allocation of SFBC blocks to non-contiguous subcarriers as described above.

SUMMARY

Particular embodiments of the present invention provide methods and devices for communicating frequency-coded symbols that include data elements and reference symbols. In one aspect, particular subcarrier frequency bands are designated for communication of reference symbols or muted reference symbols. A determination is made as to which subcarrier frequency bands can be used to communicate data, and a determination is made as to which subcarrier bands to mute. In some instances, all subcarrier frequency bands may be muted.

In one particular aspect, a method for data transmission on a plurality of subcarrier frequency bands is provided. First, a number of subcarrier frequency bands allocated for reference symbols identified as muted is determined, and a determination whether to mute all of the plurality of subcarrier frequency bands is made by applying a predetermined rule to the determined number. If a determination not to mute all of the plurality of subcarrier frequency bands is made, subcarrier frequency bands available for transmitting data elements are identified. The identification may be based on identifying one or more subcarrier frequency bands allocated for transmitting one or more corresponding reference symbols. Then, a set of pairs of subcarrier frequency bands is determined from the determined available subcarrier frequency bands. Each pair includes a first subcarrier frequency band and a second subcarrier frequency band adjacent to the first subcarrier frequency band, wherein each subcarrier frequency band is associated with no more than one pair. Each of the data elements is then simultaneously transmitted on both of the first and second subcarrier frequency bands in a corresponding pair within the determined set of pairs.

In some embodiments, each of the data elements may be frequency coded using space frequency block coding (SFBC). Each of the SFBC-coded data elements and each reference symbol may be included within an orthogonal frequency division multiplexing (OFDM) symbol. Each reference symbol may include a channel state information—reference symbol (CSI-RS). If a determination not to mute all of the plurality of subcarrier frequency bands is made, the predetermined rule may include muting each subcarrier frequency band not included in the determined set of pairs.

In some embodiments, if a determination not to mute all of the plurality of subcarrier frequency bands is made, the method may further include selecting a first unpaired subcarrier frequency band that is identified as being available for transmitting data elements and not included in the determined set of pairs, and determining whether a second unpaired subcarrier frequency band that is identified as being available for transmitting data elements and not included in the determined set of pairs and that has a frequency separation from the first unpaired subcarrier frequency band no greater than double a bandwidth of a single subcarrier frequency band exists within the plurality of subcarrier frequency bands. If said second unpaired subcarrier frequency band is determined to exist, the method may further include forming a pair including the first and second unpaired subcarrier frequency bands and including the formed pair in the determined set of pairs. If said second unpaired subcarrier frequency band is determined not to exist, the method may include muting the first unpaired subcarrier frequency band. These steps may be repeated until all unpaired subcarrier frequency bands that are identified as being available for transmitting data elements are muted or included in a formed pair.

In some embodiments, if the determined number of subcarrier frequency bands allocated for a reference symbol identified as muted is greater than two, the predetermined rule includes muting all of the plurality of subcarrier frequency bands. In other embodiments, a different threshold number of muted reference symbols may be used for the determination of whether to mute all of the plurality of subcarrier frequency bands.

In another aspect, a device is provided. The device comprises a processor, a transmitter coupled to the processor, and at least a first pair of transmission antennas coupled to the transmitter. The processor is configured to determine, from within a plurality of subcarrier frequency bands, a number of subcarrier frequency bands allocated for a reference symbol identified as muted, and to determine whether to mute all of the plurality of subcarrier frequency bands by applying a predetermined rule to the determined number. If a determination not to mute all of the plurality of subcarrier frequency bands is made, the processor is further configured to identify subcarrier frequency bands available for transmitting data elements. The identification may be based on identifying one or more subcarrier frequency bands allocated for transmitting one or more reference symbols. The processor is further configured to determine a set of pairs of subcarrier frequency bands from said identified available subcarrier frequency bands. Each pair includes a first subcarrier frequency band and a second subcarrier frequency band adjacent to the first subcarrier frequency band, wherein each subcarrier frequency band is associated with no more than one pair. The processor is further configured to cause the transmitter to use the at least first pair of transmission antennas to simultaneously transmit each of the data elements on both of the first and second subcarrier frequency bands in a corresponding pair within the determined set of pairs.

In some embodiments, each of the data elements may be frequency coded using space frequency block coding (SFBC). Each of the SFBC-coded data elements and each reference symbol may be included within an orthogonal frequency division multiplexing (OFDM) symbol. Each reference symbol may include a channel state information—reference symbol (CSI-RS). If a determination not to mute all of the plurality of subcarrier frequency bands is made, the predetermined rule may include muting each subcarrier frequency band not included in the determined set of pairs.

In some embodiments, if a determination not to mute all of the plurality of subcarrier frequency bands is made, the processor may be further configured to select a first unpaired subcarrier frequency band that is identified as being available for transmitting data elements and not included in the determined set of pairs, and to determine whether a second unpaired subcarrier frequency band that is identified as being available for transmitting data elements and not included in the determined set of pairs and that has a frequency separation from the first unpaired subcarrier frequency band no greater than double a bandwidth of a single subcarrier frequency band exists within the predetermined plurality of subcarrier frequency bands. If said second unpaired subcarrier frequency band is determined to exist, the processor may be further configured to form a pair including the first and second unpaired subcarrier frequency bands and including the formed pair in the determined set of pairs. If said second unpaired subcarrier frequency band is determined not to exist, the processor may be further configured to mute the first unpaired subcarrier frequency band. The processor may be further configured to repeat the above steps until all subcarrier frequency bands that are identified as being available for transmitting data elements are muted or included in a formed pair.

In some embodiments, if the determined number of subcarrier frequency bands allocated for a reference symbol identified as muted is greater than two, the predetermined rule includes muting all of the plurality of subcarrier frequency bands. In other embodiments, a different threshold number of muted reference symbols may be used for the determination of whether to mute all of the plurality of subcarrier frequency bands.

In yet another aspect, a method for data reception on a plurality of subcarrier frequency bands is provided. The method comprises determining a number of subcarrier frequency bands allocated for a reference symbol identified as muted; and determining whether to mute all of the plurality of subcarrier frequency bands by applying a predetermined rule to the determined number. If a determination not to mute all of the plurality of subcarrier frequency bands is made, the method further comprises identifying subcarrier frequency bands available for receiving data elements. The identification may be based on identifying one or more subcarrier frequency bands for receiving one or more corresponding reference symbols. Next, a set of pairs of subcarrier frequency bands is determined from said determined available subcarrier frequency bands. Each pair includes a first subcarrier frequency band and a second subcarrier frequency band adjacent to the first subcarrier frequency band, wherein each subcarrier frequency band is associated with no more than one pair. Each of the data elements is then simultaneously received on both of the first and second subcarrier frequency bands in a corresponding pair within the determined set of pairs.

In some embodiments, each of the data elements may be frequency coded using space frequency block coding (SFBC). Each of the SFBC-coded data elements and each reference symbol may be included within an orthogonal frequency division multiplexing (OFDM) symbol. Each reference symbol may include a channel state information—reference symbol (CSI-RS). If a determination not to mute all of the plurality of subcarrier frequency bands is made, the predetermined rule may include muting each subcarrier frequency band not included in the determined set of pairs.

In some embodiments, if a determination not to mute all of the plurality of subcarrier frequency bands is made, the method may further include selecting a first unpaired subcarrier frequency band that is identified as being available for receiving data elements and not included in the determined set of pairs, and determining whether a second unpaired subcarrier frequency band that is identified as being available for receiving data elements and not included in the determined set of pairs and that has a frequency separation from the first unpaired subcarrier frequency band no greater than double a bandwidth of a single subcarrier frequency band exists within the plurality of subcarrier frequency bands. If said second unpaired subcarrier frequency band is determined to exist, the method may further include forming a pair including the first and second unpaired subcarrier frequency bands and including the formed pair in the determined set of pairs. If said second unpaired subcarrier frequency band is determined not to exist, the method may further include muting the first unpaired subcarrier frequency band. The method may further include repeating the above steps until all unpaired subcarrier frequency bands that are identified as being available for receiving data elements are muted or included in a pair.

In some embodiments, if the determined number of subcarrier frequency bands allocated for a reference symbol identified as muted is greater than two, the predetermined rule includes muting all of the plurality of subcarrier frequency bands. In other embodiments, a different threshold number of muted reference symbols may be used for the determination of whether to mute all of the plurality of subcarrier frequency bands.

In still another aspect, a device is provided. The device comprises a processor, a receiver coupled to the processor, and at least a first pair of reception antennas coupled to the receiver. The processor is configured to determine, from within a plurality of subcarrier frequency bands, a number of subcarrier frequency bands allocated for a reference symbol identified as muted, and to determine whether to mute all of the plurality of subcarrier frequency bands by applying a predetermined rule to the determined number. If a determination not to mute all of the plurality of subcarrier frequency bands is made, the processor is further configured to identify subcarrier frequency bands available for receiving data elements. The identification may be based on identifying one or more subcarrier frequency bands for receiving one or more reference symbols. The processor is further configured to determine a set of pairs of subcarrier frequency bands from said identified available subcarrier frequency bands. Each pair includes a first subcarrier frequency band and a second subcarrier frequency band adjacent to the first subcarrier frequency band, wherein each subcarrier frequency band is associated with no more than one pair. The processor is further configured to cause the receiver to use the at least first pair of reception antennas to simultaneously receive each of the data elements on both of the first and second subcarrier frequency bands in a corresponding pair within the determined set of pairs.

In some embodiments, each of the data elements may be frequency coded using space frequency block coding (SFBC). Each of the SFBC-coded data elements and each reference symbol may be included within an orthogonal frequency division multiplexing (OFDM) symbol. Each reference symbol may include a channel state information—reference symbol (CSI-RS). If a determination not to mute all of the plurality of subcarrier frequency bands is made, the predetermined rule may include muting each subcarrier frequency band not included in the determined set of pairs.

In some embodiments, if a determination not to mute all of the plurality of subcarrier frequency bands is made, the processor may be further configured to select a first unpaired subcarrier frequency band that is identified as being available for receiving data elements and not included in the determined set of pairs, and to determine whether a second unpaired subcarrier frequency band that is identified as being available for receiving data elements and not included in the determined set of pairs and that has a frequency separation from the first unpaired subcarrier frequency band no greater than double a bandwidth of a single subcarrier frequency band exists within the predetermined plurality of subcarrier frequency bands. If said second unpaired subcarrier frequency band is determined to exist, the processor may be further configured to form a pair including the first and second unpaired subcarrier frequency bands and to include the formed pair in the determined set of pairs. If said second unpaired subcarrier frequency band is determined not to exist, the processor may be further configured to mute the first unpaired subcarrier frequency band. The processor may be further configured to repeat the above steps until all subcarrier frequency bands that are identified as being available for receiving data elements are muted or included in a pair.

In some embodiments, if the determined number of subcarrier frequency bands allocated for a reference symbol identified as muted is greater than two, the predetermined rule includes muting all of the plurality of subcarrier frequency bands. In other embodiments, a different threshold number of muted reference symbols may be used for the determination of whether to mute all of the plurality of subcarrier frequency bands.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

In exemplary embodiments of the disclosed devices and methods, an application of a muting rule in subframes having reference symbols and in subframes having up to a predetermined number of muted reference symbol patterns is described. The muting rules described herein provide an effective means for eliminating frequency gaps in SFBC codes. Further, the overhead increased by such muting is minimized, because the muting rule effectively minimizes the number of resource elements to be muted. Moreover, the cases of subframes having more than a certain number of muted reference symbol patterns are also covered by the described solutions. In these cases, all data resource elements are muted when SFBC schemes are used.

Figure 1:
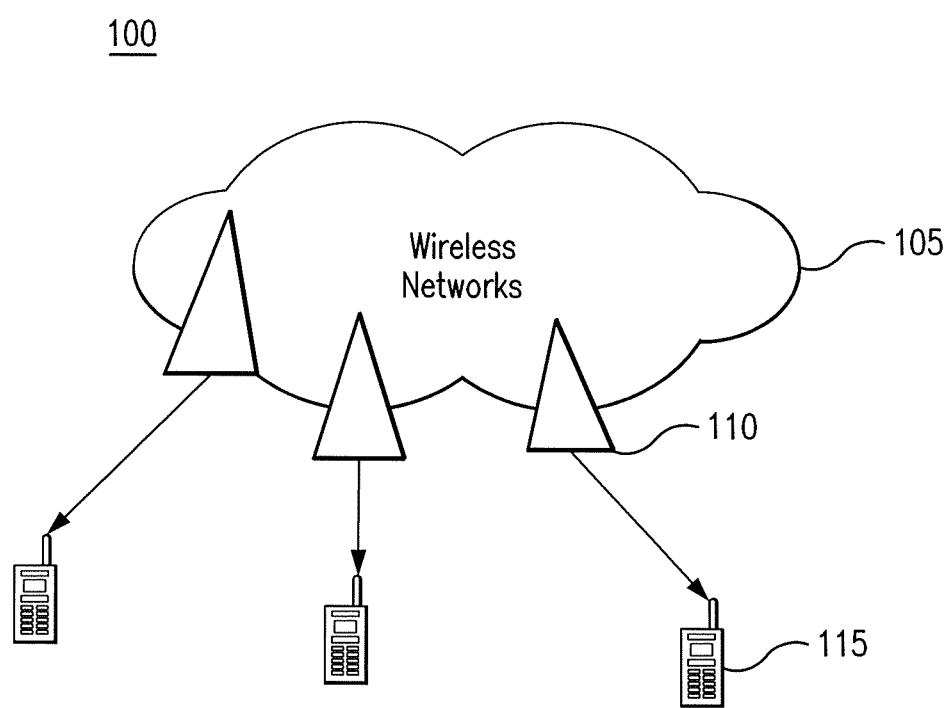
FIG. 1 illustrates an architecture of a wireless communication system according to an exemplary embodiment of the present invention.

FIG. 1 illustrates an example wireless communication system 100. As shown, wireless communication system 100 includes a wireless network 105, base stations 110, and wireless user equipment (UE) communication devices 115. Examples of wireless UE communication devices include mobile telephones, personal digital assistants, electronic readers, portable electronic tablets, personal computers, and laptop computers.

Figure 2:
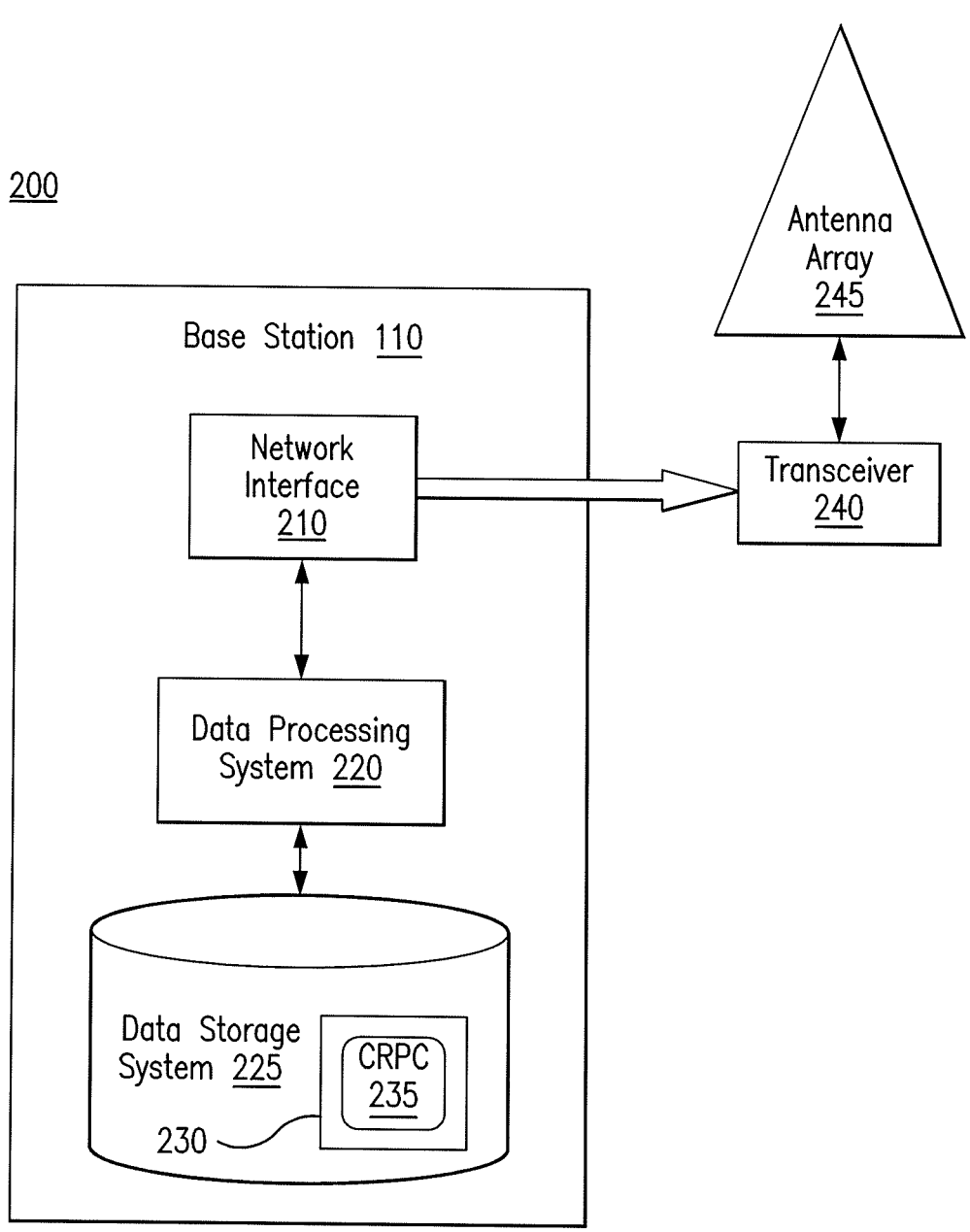
FIG. 2 is a block diagram of a base station as used in the system of FIG. 1.

Referring now to FIG. 2, FIG. 2 illustrates a block diagram of a base station 110 according to exemplary embodiments of the disclosed solution. As shown in FIG. 2, the base station 110 may include: a data processing system 220, which may include one or more microprocessors and/or one or more circuits, such as an application specific integrated circuit (ASIC), Field-programmable gate arrays (FPGAs), and the like; network interface 210; and a data storage system 225, which may include one or more non-volatile storage devices and/or one or more volatile storage devices (e.g., random access memory (RAM)). The network interface 210 is connected to transceiver 240, which is configured to transmit and receive signals via an antenna array 245. In embodiments where data processing system 220 includes a microprocessor, computer readable program code 235 may be stored in a computer readable medium 230, such as, but not limited, to magnetic media (e.g., a hard disk), optical media (e.g., a DVD), memory devices (e.g., random access memory), and the like. In some embodiments, computer readable program code 235 is configured such that when executed by a processor, code 235 causes the data processing system 220 to perform steps described below (e.g., steps described below with reference to the flow charts shown in FIGS. 8 and/or 10). In other embodiments, the base station 110 is configured to perform steps described above without the need for code 235. That is, for example, data processing system 220 may consist merely of one or more ASICs. Hence, the features of the present invention described above may be implemented in hardware and/or software. For example, in particular embodiments, the functional components of the base station described above may be implemented by data processing system 220 executing computer instructions 235, by data processing system 220 operating independent of any computer instructions 235, or by any suitable combination of hardware and/or software.

Figure 3:
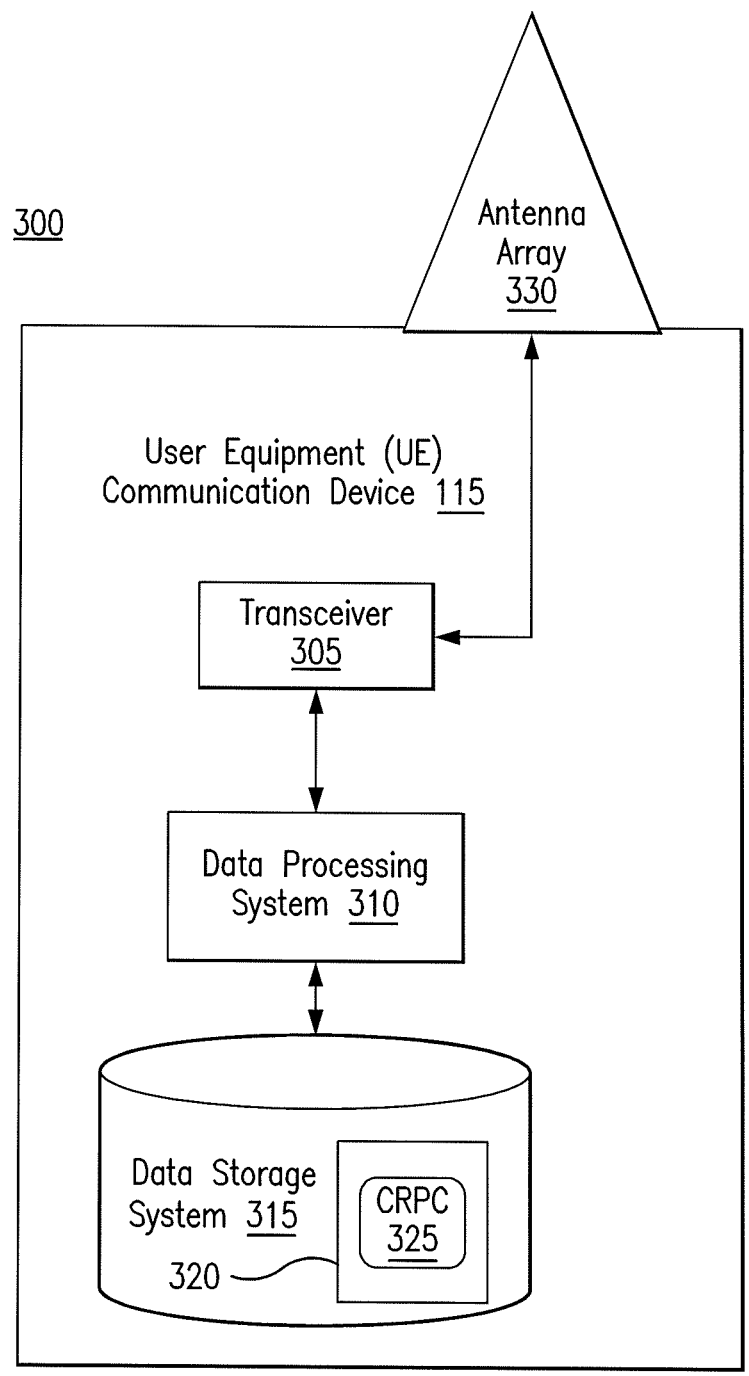
FIG. 3 is a block diagram of a wireless user equipment (UE) communication device as used in the system of FIG. 1.

Referring now to FIG. 3, FIG. 3 illustrates a block diagram of a wireless UE communication device 115 according to some embodiments of the invention. As shown in FIG. 3, wireless UE communication device 115 may include: a data processing system 310, which may include one or more microprocessors and/or one or more circuits, such as an application specific integrated circuit (ASIC), field-programmable gate arrays (FPGAs), and the like; a transceiver 305 for transmitting data to (and receiving data from) base station 110 via antenna array 330; and a data storage system 315, which may include one or more non-volatile storage devices and/or one or more volatile storage devices (e.g., random access memory (RAM)). In embodiments where data processing system 310 includes a microprocessor, computer readable program code 325 may be stored in a computer readable medium 320, such as, but not limited, to magnetic media (e.g., a hard disk), optical media (e.g., a DVD), memory devices (e.g., random access memory), and the like. In some embodiments, computer readable program code 325 is configured such that when executed by a processor, code 325 causes wireless UE communication device 115 to perform steps described below (e.g., steps described below with reference to the flow charts shown in FIGS. 8 and 10). In other embodiments, wireless UE communication device 115 is configured to perform steps described above without the need for code 325. That is, for example, data processing system 310 may consist merely of one or more ASICs. Hence, the features of the present invention described above may be implemented in hardware and/or software. For example, in particular embodiments, the functional components of wireless UE communication device 115 described above may be implemented by data processing system 310 executing computer instructions 325, by data processing system 310 operating independent of any computer instructions 325, or by any suitable combination of hardware and/or software.

Figure 4:
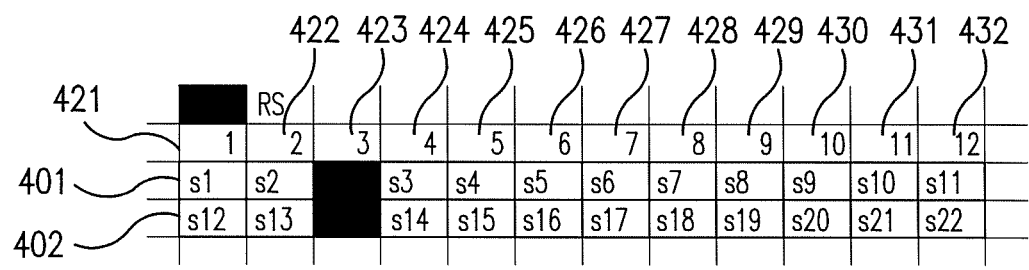
FIG. 4 is a first exemplary allocation of subcarrier frequency bands according to an exemplary embodiment of the present invention.

In exemplary embodiments of the disclosed devices and methods, the base station 110 and the wireless UE communication device 115 may be configured to communicate with each other by using an SFBC transmission scheme with diversity to communicate orthogonal frequency division multiplexed (OFDM) symbols that include data elements and reference symbols. Referring now to FIG. 4, a first exemplary allocation of subcarrier frequency bands is illustrated. In the allocation of FIG. 4, there are twelve consecutive subcarrier frequency bands 421-432, and two consecutive time slots 401, 402. The third subcarrier 423 has been designated for transmission of a CSI-RS reference symbol, and all of the remaining subcarriers are available for data transmission. Thus, using the Alamouti SFBC scheme causes the following allocations: Data elements s1 and s2 are paired for transmission on respective subcarriers 421 and 422 at time 401; data elements s3 and s4 are paired for transmission on respective subcarriers 424 and 425 at time 401; data elements s5 and s6 are paired for transmission on respective subcarriers 426 and 427 at time 401; data elements s7 and s8 are paired for transmission on respective subcarriers 428 and 429 at time 401; data elements s9 and s10 are paired for transmission on respective subcarriers 430 and 431 at time 401; data elements s11 and s12 are paired for transmission on respective subcarriers 432 (at time 401) and 421 (at time 402); data elements s13 and s14 are paired for transmission on respective subcarriers 422 and 424 at time 402; data elements s15 and s16 are paired for transmission on respective subcarriers 425 and 426 at time 402; data elements s17 and s18 are paired for transmission on respective subcarriers 427 and 428 at time 402; data elements s19 and s20 are paired for transmission on respective subcarriers 429 and 430 at time 402; and data elements s21 and s22 are paired for transmission on respective subcarriers 431 and 432 at time 402. Accordingly, due to the presence of reference symbols in subcarrier 423, one of the SFBC blocks (i.e., s11, s12) is paired for transmission of two subcarriers which are separated in frequency from one another by a gap that is equal to 10 subcarrier frequency bandwidths. This causes the channel conditions to be significantly different for these two data elements, thereby leading to performance degradation at the receiver.

Particular embodiments of the devices and methods disclosed herein avoid frequency gaps inside SFBC blocks by applying muting rules for the data channel (referred to as the physical downlink shared channel, or PDSCH, in 3GPP LTE) when SFBC is used as the transmission scheme in a subframe that is also carrying one or more reference symbols, or one or more muted reference symbols. The muting rules can be applied in a receiver or in a transmitter. Muting rules may include muting one or more data elements. In some instances, the muting rules may include muting all data elements in the OFDM symbols carrying muted CSI-RS reference symbols, depending on the number and frequency configuration of the muted CSI-RS reference symbols.

In exemplary embodiments of the disclosed devices and methods, when the SFBC transmission scheme is used in combination with reference symbols, and in order to avoid situations where SFBC blocks are split between non-adjacent subcarriers, the non-adjacent subcarriers are muted. In an exemplary embodiment, a muting rule may be applied such that the muting rule identifies blocks of contiguous resource blocks which are allocated to the same wireless user communication device, referred to herein as allocation islands, and then mutes only one non-adjacent resource element in each resource block in which there is a non-adjacent resource element. For example, the first or last resource element of the resource block may be muted, or a different resource element may be selected for muting, depending on the configuration of the reference symbol pattern. The muting rule can be selectively applied only at each such island and even then, only in islands where there is a non-adjacent resource element. For example, in islands with an even number of resource blocks, all resource elements can be paired with an adjacent resource element. Thus, in practice, the muting rule can be designed to identify and handle islands having an odd number of allocated resource blocks. In addition, subframes having up to a certain number of muted reference symbols can be handled through the use of this type of muting rule.

Figure 5:
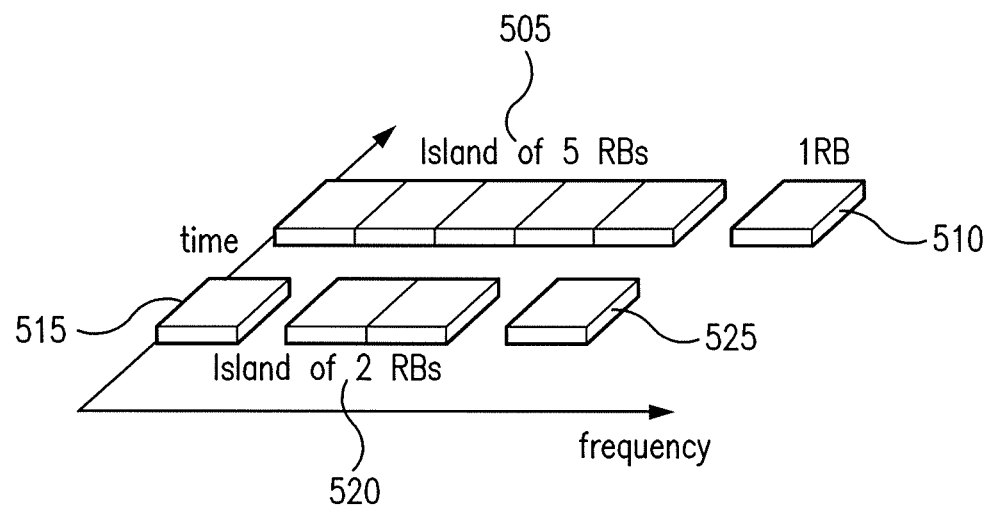
FIG. 5 is an exemplary depiction of allocation islands of resource blocks according to an exemplary embodiment of the present invention.

Referring to FIG. 5, an exemplary depiction of allocation islands of resource blocks is illustrated. Each of allocation islands 510, 515, and 525 is an island of a single resource block; allocation island 520 has two resource blocks; and allocation island 505 has five resource blocks. Thus, by applying the muting rule described above, because each of islands 505, 510, 515, and 525 has an odd number of resource blocks, a single resource element in each of these resource blocks may be muted. However, because island 520 has an even number of resource blocks, all resource elements can be paired with an adjacent resource element, and thus, no muting is required.

The application of the muting rule may also be dependent on the number of reference symbols configured. For example, the muting rule may be applied where either one or two antenna ports using CSI-RS reference symbols are used, but the muting rule may not be applied if the number of antenna ports using CSI-RS reference symbols is four or eight.

In exemplary embodiments of the disclosed devices and methods, in subframes that include at least a predetermined number of muted reference symbols, the muting rule may include muting all data resource elements for SFBC schemes in the OFDM symbols where the muted reference symbols are included. However, in some OFDM symbols that include muted reference symbols, it may be possible to transmit data on selected subcarriers while muting other non-paired subcarriers. This may occur under certain channel conditions, such as, for example, low delay spread, and when the number of muted reference symbol patterns is low. In these instances, the frequency gaps present inside the SFBC blocks must be relatively small, i.e., not greater than one or two subcarrier bandwidths, thereby yielding approximately the same channel conditions and not compromising the reliability of the communication. The number of muted CSI-RS patterns used as a threshold for this decision can be a parameter configured according to the channel conditions or could be fixed to a value.

Accordingly, in an exemplary embodiment, a rule for transmitting or receiving data on a plurality of subcarrier frequencies may include the following: First, determine the subcarrier frequencies that are allocated for reference symbols and for muted reference symbols. Next, from the remaining subcarriers, form pairs of mutually adjacent subcarriers, and then determine a set of unpaired subcarriers. Next, determine whether each unpaired subcarrier can be paired with another unpaired subcarrier such that a sufficiently small frequency gap between the two subcarriers is present. In one embodiment, the frequency gap can be no greater than one subcarrier bandwidth. However, this determination can be made based on the actual channel conditions. Finally, mute each remaining unpaired subcarrier. In some instances, this may result in muting all subcarriers.

Figure 6A:
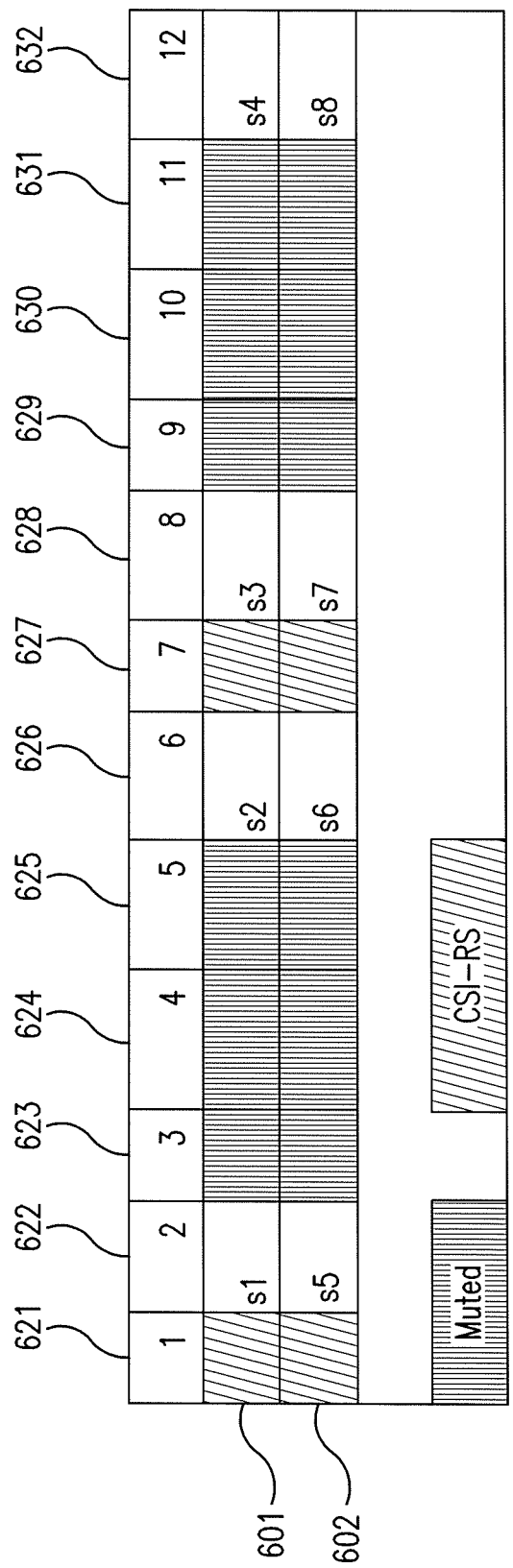
FIG. 6A is a second exemplary allocation of subcarrier frequency bands according to an exemplary embodiment of the present invention.

Referring now to FIG. 6A, a second exemplary allocation of subcarrier frequency bands is illustrated. In this allocation, subcarriers 621 and 627 are designated for transmission of CSI-RS reference symbols, and subcarriers 623, 624, 625, 629, 630, and 631 are designated for muted CSI-RS reference symbols. Thus, it is not possible to form any pairs of mutually adjacent subcarriers for data transmission. Using the Alamouti SFBC scheme would cause the following allocations: Data elements s1 and s2 are transmitted on subcarriers 622 and 626 at time 601; data elements s3 and s4 are transmitted on subcarriers 628 and 632 at time 601; data elements s5 and s6 are transmitted on subcarriers 622 and 626 at time 602; and data elements s7 and s8 are transmitted on subcarriers 628 and 632 at time 602. However, in all four of these pairings of data elements, the frequency gap between the two respective subcarriers is equal to three times the subcarrier bandwidth, which causes an unacceptable performance degradation at the receiver. Thus, in this instance, all subcarriers are muted.

Figure 6B:
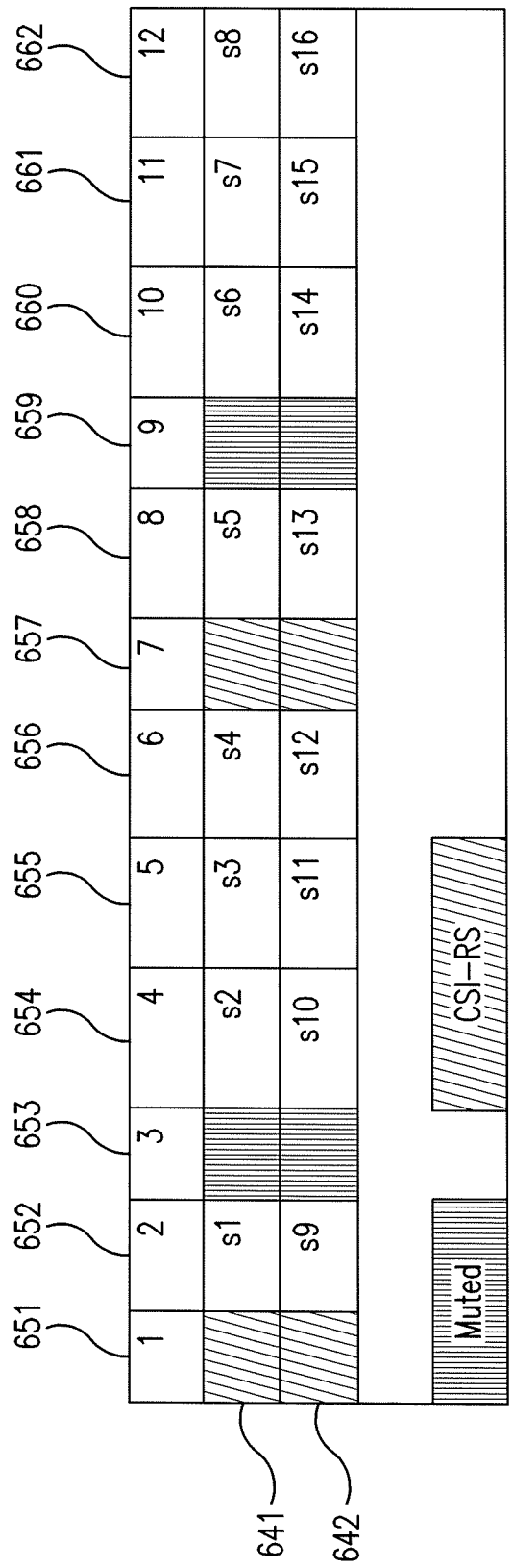
FIG. 6B is a third exemplary allocation of subcarrier frequency bands according to an exemplary embodiment of the present invention.

Referring now to FIG. 6B, a third exemplary allocation of subcarrier frequency bands is illustrated. In this allocation, subcarriers 651 and 657 are allocated for transmission of CSI-RS reference symbols, and subcarriers 653 and 659 are allocated for muted CSI-RS reference symbols. Pairs of mutually adjacent subcarriers may include the following: Data elements s3 and s4 are transmitted on subcarriers 655 and 656 at time 641; data elements s7 and s8 are transmitted on subcarriers 661 and 662 at time 641; data elements s11 and s12 are transmitted on subcarriers 655 and 656 at time 642; and data elements s15 and s16 are transmitted on subcarriers 661 and 662 at time 642. Then, from the unpaired subcarriers, new pairs may be formed as follows: Data elements s1 and s2 may be transmitted on subcarriers 652 and 654 at time 641, because the frequency gap between subcarriers 652 and 654 is equal to only one subcarrier bandwidth, which is deemed to be a sufficiently small frequency gap to yield approximately constant channel conditions. Similarly, data elements s5 and s6 may be transmitted on subcarriers 658 and 660 at time 641; data elements s9 and s10 may be transmitted on subcarriers 652 and 654 at time 642; and data elements s13 and s14 may be transmitted on subcarriers 658 and 660 at time 642, all based on the respective frequencies gaps being equal to one subcarrier bandwidth. Thus, in this instance, it is not necessary to mute the entire OFDM symbol, despite the allocation of some subcarriers to muted reference symbols.

Figure 7:
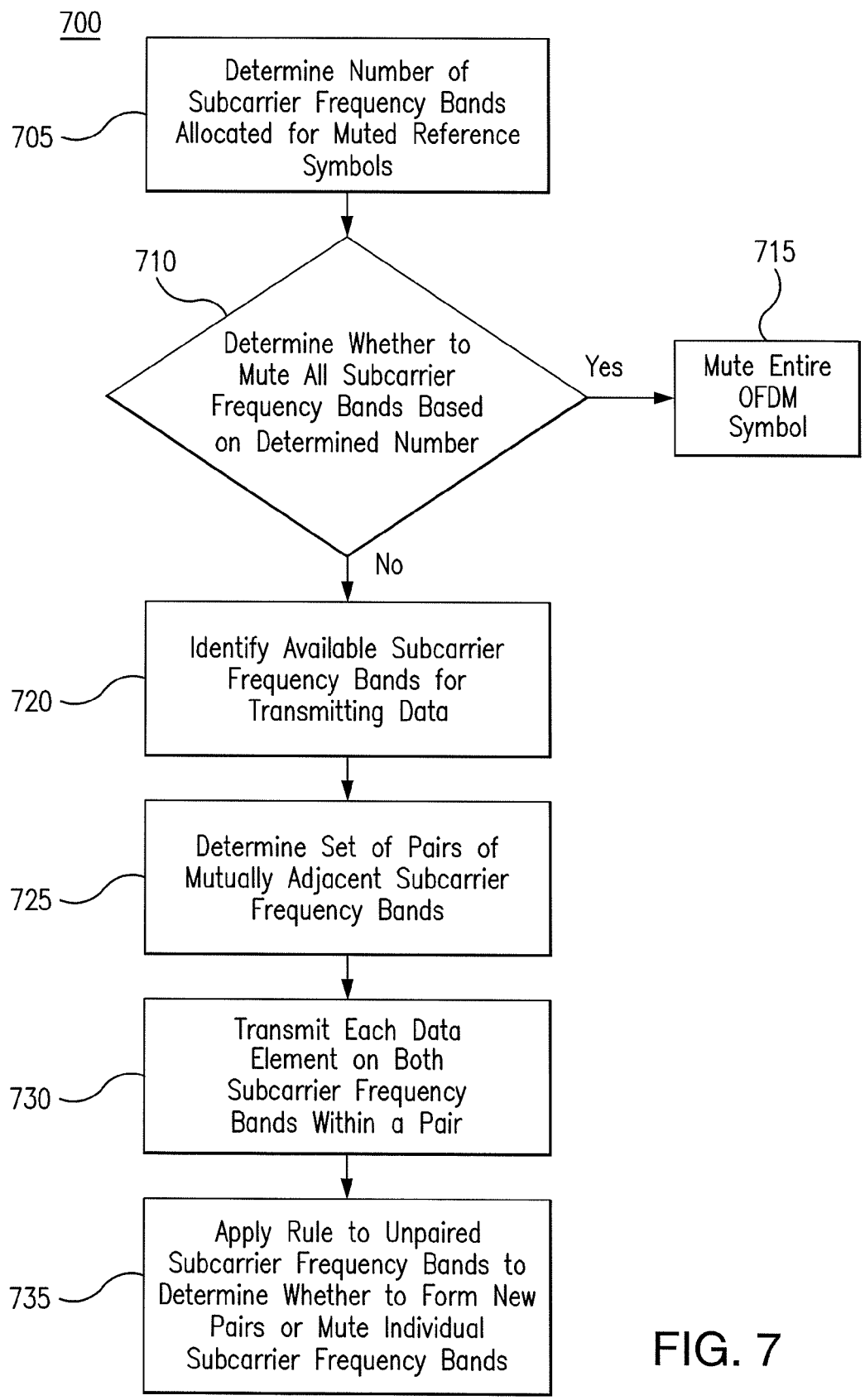
FIG. 7 is a flow chart illustrating a process for transmitting data elements and reference symbols while muting selected subcarrier frequency bands, in accordance with exemplary embodiments of the present invention.

Referring now to FIG. 7, a flow chart 700 illustrating a process for OFDM data transmission on a plurality of subcarrier frequency bands, in accordance with exemplary embodiments of the disclosed devices and methods, is shown. In the first step 705 of the process, a number of subcarrier frequency bands allocated for muted reference symbols, such as, for example, CSI-RS reference symbols, is determined. Then, at step 710, the determined number is used to determine whether to mute all of the subcarrier frequency bands. If a determination is made to mute all subcarrier frequency bands, then the entire OFDM symbol is muted at step 715.

If a determination not to mute all subcarrier frequency bands is made, then at step 720, subcarrier frequency bands that are available for transmitting data elements are identified. This identification may be made based on subcarrier frequency bands that are allocated for reference symbols, such as CSI-RS reference symbols. Then, at step 725, a set of pairs of mutually adjacent subcarrier frequency bands is determined.

At step 730, each data element is transmitted on both subcarrier frequency bands within a pair from the set of pairs. Finally, at step 735, the predetermined rule is applied to the unpaired subcarrier frequency bands to determine whether to form new pairs and/or mute individual subcarrier frequency bands.

The process illustrated in flow chart 700 may further include, at step 740, selecting a first unpaired subcarrier frequency band that is identified as being available for transmitting data elements and not included in the determined set of pairs, and at step 745, determining whether a second unpaired subcarrier frequency band that is identified as being available for transmitting data elements and not included in the determined set of pairs and that has a frequency separation from the first unpaired subcarrier frequency band no greater than double a bandwidth of a single subcarrier frequency band exists within the plurality of subcarrier frequency bands. If the second unpaired subcarrier frequency band is determined to exist, then at step 750, a pair including the first and second unpaired subcarrier frequency bands and including the formed pair in the determined set of pairs is formed. If the second unpaired subcarrier frequency band is determined not to exist, that at step 755, the first unpaired subcarrier frequency band is muted. These steps may be repeated until all unpaired subcarrier frequency bands that are identified as being available for transmitting data elements are muted or included in a formed pair.

In exemplary embodiments, if the determined number of subcarrier frequency bands allocated for a reference symbol identified as muted is greater than two, the predetermined rule includes muting all of the plurality of subcarrier frequency bands. Alternatively, a different threshold number of muted reference symbols may be used for the determination of whether to mute all of the plurality of subcarrier frequency bands.

Figure 8:
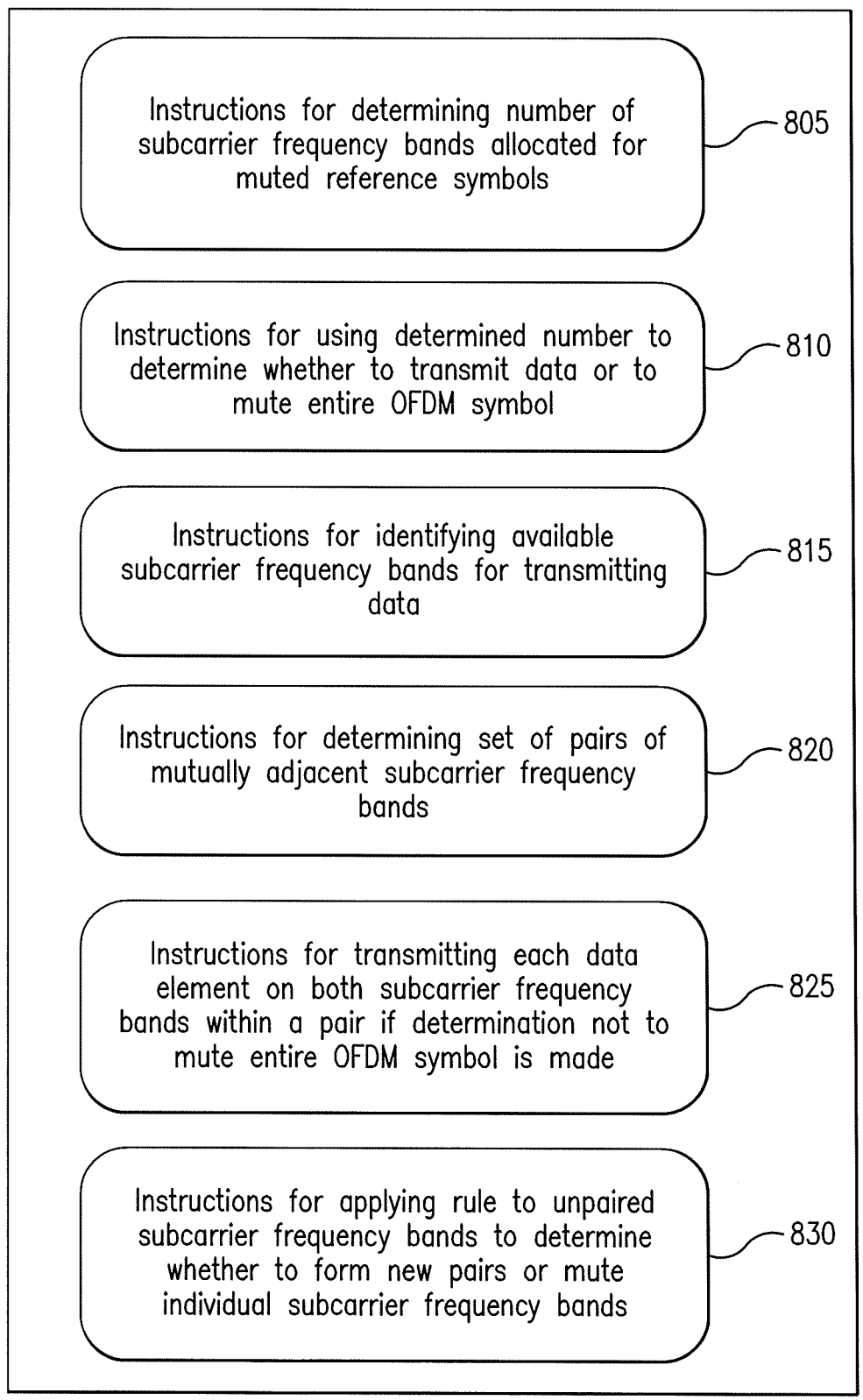
FIG. 8 is a block diagram illustrating example software components of a wireless UE communication device or a base station, in accordance with exemplary embodiments of the present invention.

Referring now to FIG. 8, a block diagram 800 illustrating example software components of a wireless UE communication device 115 or a base station 110, in accordance with exemplary embodiments of the disclosed devices and methods, is shown. First, at 805, a set of instructions for determining a number of subcarrier frequency bands allocated for muted reference symbols, such as, for example, CSI-RS reference symbols, is executed. Then, at 810, a set of instructions for using the determined number to determine whether to transmit data or to mute an entire OFDM symbol is executed.

At 815, a set of instructions for identifying subcarrier frequency bands available for transmitting data elements is executed. Then, at 820, a set of instructions for determining a set of pairs of mutually adjacent subcarrier frequency bands is executed.

At 825, a set of instructions for transmitting each data element on both subcarrier frequency bands within a pair is executed. Finally, at 830, a set of instructions for applying the predetermined rule to the unpaired subcarrier frequency bands is executed. The application of the rule determines whether to form new pairs and/or mute individual subcarrier frequency bands.

The example software components of a wireless UE communication device 115 or a base station 110 in block diagram 800 may further include, at 835, a set of instructions for selecting a first unpaired subcarrier frequency band that is identified as being available for transmitting data elements and not included in the determined set of pairs, and at 840, a set of instructions for determining whether a second unpaired subcarrier frequency band that is identified as being available for transmitting data elements and not included in the determined set of pairs and that has a frequency separation from the first unpaired subcarrier frequency band no greater than double a bandwidth of a single subcarrier frequency band exists within the predetermined plurality of subcarrier frequency bands. If the second unpaired subcarrier frequency band is determined to exist, then at 845, a set of instructions for forming a pair including the first and second unpaired subcarrier frequency bands and including the formed pair in the determined set of pairs is included. If the second unpaired subcarrier frequency band is determined not to exist, then at 850, a set of instructions for muting the first unpaired subcarrier frequency band is included. The above instructions may be repeated until all subcarrier frequency bands that are identified as being available for transmitting data elements are muted or included in a formed pair.

In exemplary embodiments, if the determined number of subcarrier frequency bands allocated for a reference symbol identified as muted is greater than two, the predetermined rule includes muting all of the plurality of subcarrier frequency bands. Alternatively, a different threshold number of muted reference symbols may be used for the determination of whether to mute all of the plurality of subcarrier frequency bands.

Figure 9:
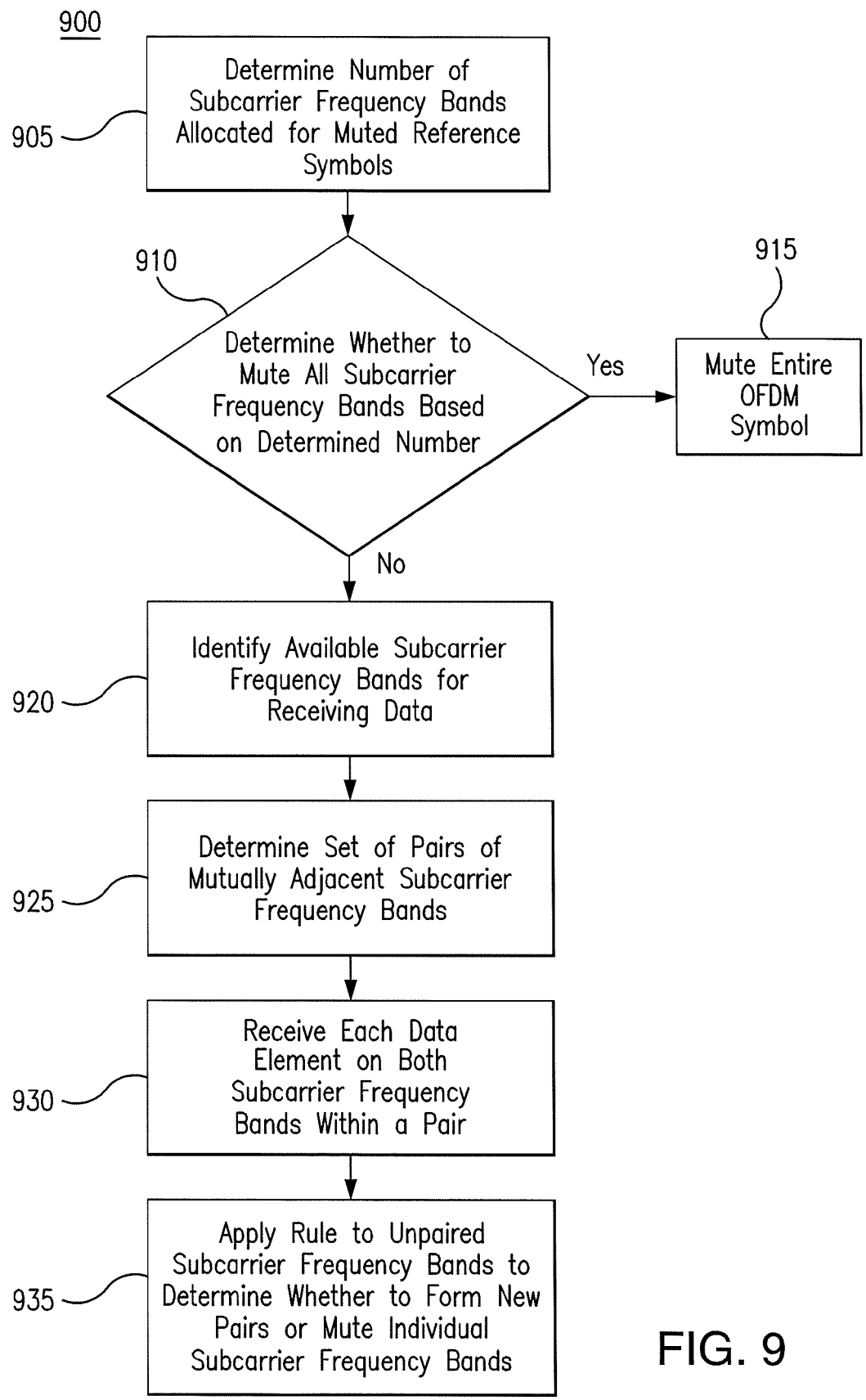
FIG. 9 is a flow chart illustrating a process for receiving data elements and reference symbols while muting selected subcarrier frequency bands, in accordance with exemplary embodiments of the present invention.

Referring now to FIG. 9, a flow chart 900 illustrating a process for OFDM data reception on a plurality of subcarrier frequency bands, in accordance with exemplary embodiments of the disclosed devices and methods, is shown. In the first step 905 of the process, a number of subcarrier frequency bands allocated for muted reference symbols, such as, for example, CSI-RS reference symbols, is determined. Then, at step 910, the determined number is used to determine whether to mute all of the subcarrier frequency bands. If a determination is made to mute all subcarrier frequency bands, then the entire OFDM symbol is muted at step 915.

If a determination not to mute all subcarrier frequency bands is made, then at step 920, subcarrier frequency bands that are available for receiving data elements are identified. This identification may be made based on subcarrier frequency bands that are allocated for reference symbols, such as CSI-RS reference symbols. Then, at step 925, a set of pairs of mutually adjacent subcarrier frequency bands is determined.

At step 930, each data element is received on both subcarrier frequency bands within a pair. At step 935, the predetermined rule is applied to the unpaired subcarrier frequency bands to determine whether to form new pairs and/or mute individual subcarrier frequency bands.

The process illustrated in flow chart 900 may further include, at step 940, selecting a first unpaired subcarrier frequency band that is identified as being available for receiving data elements and not included in the determined set of pairs, and at step 945, determining whether a second unpaired subcarrier frequency band that is identified as being available for receiving data elements and not included in the determined set of pairs and that has a frequency separation from the first unpaired subcarrier frequency band no greater than double a bandwidth of a single subcarrier frequency band exists within the plurality of subcarrier frequency bands. If the second unpaired subcarrier frequency band is determined to exist, then at step 950, a pair including the first and second unpaired subcarrier frequency bands and including the formed pair in the determined set of pairs is formed. If the second unpaired subcarrier frequency band is determined not to exist, then at step 955, the first unpaired subcarrier frequency band is muted. These steps may be repeated until all unpaired subcarrier frequency bands that are identified as being available for receiving data elements are muted or included in a pair.

In exemplary embodiments, if the determined number of subcarrier frequency bands allocated for a reference symbol identified as muted is greater than two, the predetermined rule includes muting all of the plurality of subcarrier frequency bands. Alternatively, a different threshold number of muted reference symbols may be used for the determination of whether to mute all of the plurality of subcarrier frequency bands.

Figure 10:
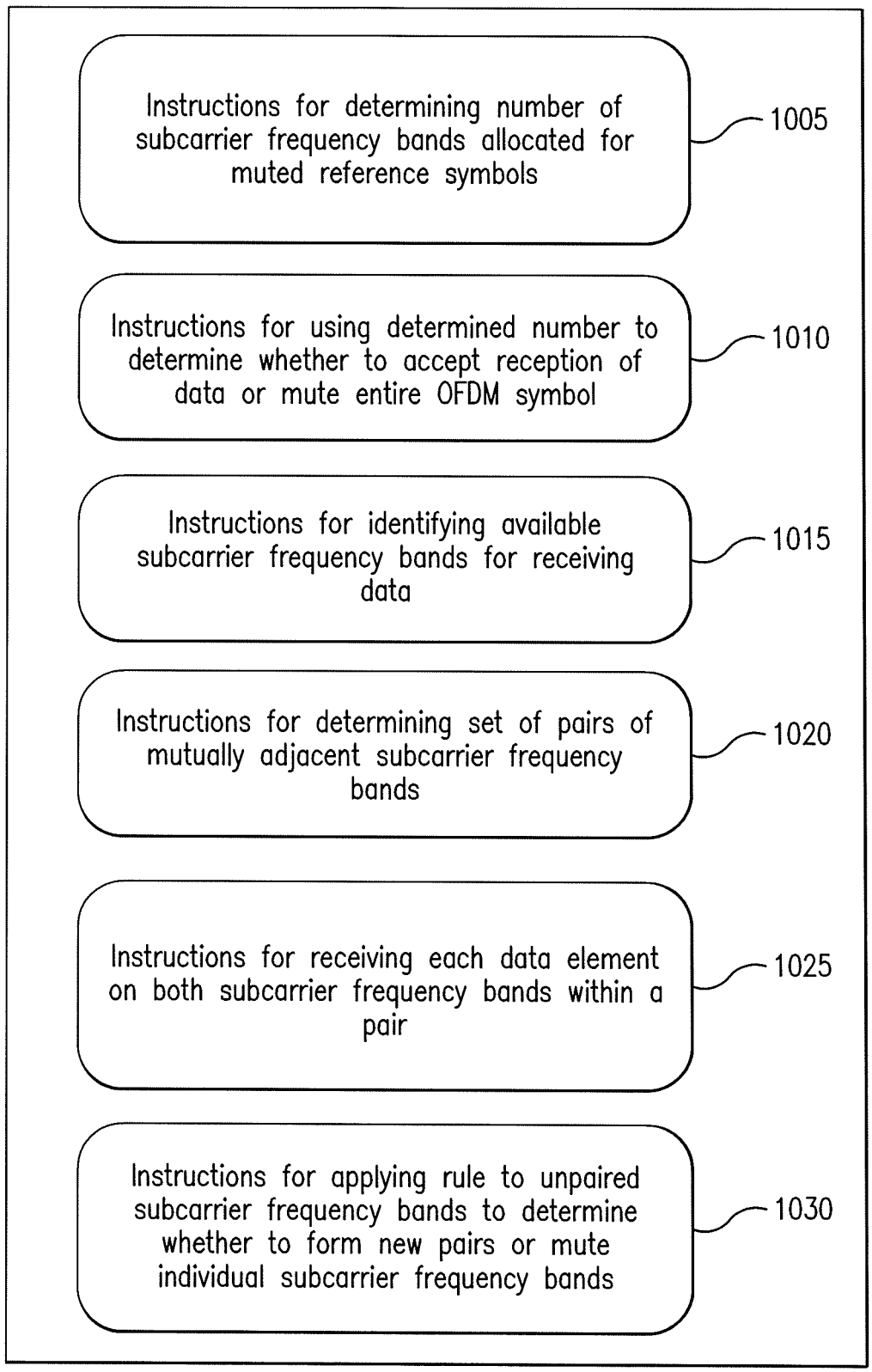
FIG. 10 is a block diagram illustrating example software components of a wireless UE communication device or a base station, in accordance with exemplary embodiments of the present invention.

Referring now to FIG. 10, a block diagram 1000 illustrating example software components of a wireless UE communication device 115 or base station 110, in accordance with exemplary embodiments of the disclosed devices and methods, is shown. First, at 1005, a set of instructions for determining a number of subcarrier frequency bands allocated for muted reference symbols, such as, for example, CSI-RS reference symbols, is executed. Then, at 1010, a set of instructions for using the determined number to determine whether to accept reception of data or mute an entire OFDM symbol is executed.

At 1015, a set of instructions for identifying subcarrier frequency bands available for receiving data elements is executed. Then, at 1020, a set of instructions for determining a set of pairs of mutually adjacent subcarrier frequency bands is executed.

At 1025, a set of instructions for receiving each data element on both subcarrier frequency bands within a pair is executed. Finally, at 1030, a set of instructions for applying the predetermined rule to the unpaired subcarrier frequency bands is executed. The application of the rule determines whether to form new pairs and/or to mute individual subcarrier frequency bands.

The example software components of a wireless UE device or a base station in block diagram 1000 may further include, at 1035, a set of instructions for selecting a first unpaired subcarrier frequency band that is identified as being available for receiving data elements and not included in the determined set of pairs, and at 1040, a set of instructions for determining whether a second unpaired subcarrier frequency band that is identified as being available for receiving data elements and not included in the determined set of pairs and that has a frequency separation from the first unpaired subcarrier frequency band no greater than double a bandwidth of a single subcarrier frequency band exists within the predetermined plurality of subcarrier frequency bands. If the second unpaired subcarrier frequency band is determined to exist, then at 1045, a set of instructions for forming a pair including the first and second unpaired subcarrier frequency bands and to include the formed pair in the determined set of pairs is included. If the second unpaired subcarrier frequency band is determined not to exist, that at 1050, a set of instructions for muting the first unpaired subcarrier frequency band is included. The above instructions may be repeated until all subcarrier frequency bands that are identified as being available for receiving data elements are muted or included in a pair.

In exemplary embodiments, if the determined number of subcarrier frequency bands allocated for a reference symbol identified as muted is greater than two, the predetermined rule includes muting all of the plurality of subcarrier frequency bands. Alternatively, a different threshold number of muted reference symbols may be used for the determination of whether to mute all of the plurality of subcarrier frequency bands.

While various embodiments have been described above, it should be understood that they have been presented by way of example only, and not limitation. For example, exemplary embodiments of the disclosed solution may be applicable to any of the following: Third Generation Partnership Project Long Term Evolution (3GPP LTE) systems; Wideband Code Division Multiple Access (WCDMA) systems; Worldwide Interoperability for Microwave Access (WiMAX) systems; Ultra Mobile Broadband (UMB) systems; and any other communications systems that use diversity for communication of data elements and reference symbols. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for transmitting data on a carrier frequency band having a plurality of subcarrier frequency bands, comprising:

identifying one or more subcarrier frequency bands for transmitting one or more corresponding reference symbols;

determining a number of available subcarrier frequency bands for transmitting data symbols;

determining whether to transmit the data symbols on the available subcarrier frequency bands based at least in part on a predetermined rule, wherein the predetermined rule includes allowing transmission of data symbols on the available subcarrier frequency bands when the determined number of the available subcarrier frequency bands is an even number; and simultaneously transmitting each of the data symbols on one or more pairs of the available subcarrier frequency bands, wherein each pair includes a first subcarrier frequency band and a second subcarrier frequency band adjacent to the first subcarrier frequency band, and each subcarrier frequency band is associated with no more than one pair.

2. The method according to claim 1, wherein the predetermined rule further includes muting all of the plurality of subcarrier bands of the carrier frequency when the determined number of available subcarrier frequency bands is an odd number.

3. The method according to claim 1, further comprising determining a set of unpaired subcarrier frequency bands not associated with any of the one or more pairs of the available subcarrier frequency bands.

4. The method according to claim 1, wherein the one or more reference symbols are identified as muted.

5. The method according to claim 1, wherein each of the data symbols is frequency coded using space frequency block coding (SFBC).

6. The method according to claim 5, wherein each of the SFBC-coded data symbols is included in an orthogonal frequency division multiplexing (OFDM) symbol.

7. The method according to claim 4, wherein the one or more reference symbols identified as muted include a channel state information reference symbol (CSI-RS).

8. The method according to claim 3, further comprising:
   determining that a pair of subcarrier frequency bands from the determined set of unpaired subcarrier frequency bands can be formed when a frequency separation between the subcarrier frequency bands is no greater than double a bandwidth of a single subcarrier frequency; and
   forming the pair of subcarrier frequency bands and including the formed pair in the one or more pairs of the available subcarrier frequency bands for transmitting the data symbols.

9. The method according to claim 1, wherein the predetermined rule further includes muting all of the plurality of subcarrier bands of the carrier frequency when a number of the identified one or more subcarrier frequency bands for transmitting one or more corresponding reference symbols is greater than a threshold number.

10. A device comprising:
   a processor;
   a transmitter coupled to the processor; and
   at least one pair of antennas coupled to the transmitter,
   wherein the processor is configured to:
      identify one or more subcarrier frequency bands for transmission of one or more corresponding reference symbols;
      determine a number of available subcarrier frequency bands for transmission of data symbols;
      determine whether to transmit the data symbols on the available subcarrier frequency bands based at least in part on a predetermined rule, wherein the predetermined rule includes allowing transmission of data symbols on the available subcarrier frequency bands when the determined number of the available subcarrier frequency bands is an even number; and
      simultaneously transmit each of the data symbols on one or more pairs of the available subcarrier frequency bands, wherein each pair includes a first subcarrier frequency band and a second subcarrier frequency band adjacent to the first subcarrier frequency band, and each subcarrier frequency band is associated with no more than one pair.

11. The device according to claim 10, wherein the predetermined rule further includes muting all of the plurality of subcarrier bands of the carrier frequency when the determined number of available subcarrier frequency bands is an odd number.

12. The device according to claim 10, wherein the processor is further configured to determine a set of unpaired subcarrier frequency bands not associated with any of the one or more pairs of the available subcarrier frequency bands.

13. The device according to claim 10, wherein the one or more reference symbols are identified as muted.

14. The device according to claim 10, wherein each of the data symbols is frequency coded using space frequency block coding (SFBC).

15. The device according to claim 14, wherein each of the SFBC-coded data symbols is included in an orthogonal frequency division multiplexing (OFDM) symbol.

16. The device according to claim 13, wherein the one or more reference symbols identified as muted include a channel state information reference symbol (CSI-RS).

17. The device according to claim 12, wherein the processor is further configured to:
   determine that a pair of subcarrier frequency bands from the determined set of unpaired subcarrier frequency bands can be formed when a frequency separation between the subcarrier frequency bands is no greater than double a bandwidth of a single subcarrier frequency; and
   form the pair of subcarrier frequency bands and including the formed pair in the one or more pairs of the available subcarrier frequency bands for transmitting the data symbols.

18. The device according to claim 10, wherein the predetermined rule further includes muting all of the plurality of subcarrier bands of the carrier frequency when a number of the identified one or more subcarrier frequency bands for transmitting one or more corresponding reference symbols is greater than a threshold number.

19. A method for transmitting data on a carrier frequency band having a plurality of subcarrier frequency bands, comprising:
   identifying one or more subcarrier frequency bands for transmitting one or more corresponding reference symbols;
   determining a number of available subcarrier frequency bands for transmitting data symbols;
   determining whether to transmit the data symbols on the available subcarrier frequency bands based at least in part on a predetermined rule, wherein the predetermined rule includes muting all of the plurality of subcarrier bands of the carrier frequency when the determined number of available subcarrier frequency bands is an odd number; and
   muting, in response to the determining, all of the plurality of subcarrier bands of the carrier frequency.

* * * * *

UNITED STATES PATENT AND TRADEMARK OFFICE
CERTIFICATE OF CORRECTION

PATENT NO. : 9,191,954 B2  
APPLICATION NO. : 14/103466  
DATED : November 17, 2015  
INVENTOR(S) : Anto et al.

Page 1 of 1

It is certified that error appears in the above-identified patent and that said Letters Patent is hereby corrected as shown below:

In the Specification

In Column 1, Line 8, delete "2011," and insert -- 2011, now Pat. No. 8,638,742, --, therefor.

Signed and Sealed this  
Twelfth Day of April, 2016

Michelle K. Lee  
*Director of the United States Patent and Trademark Office*